United States Patent
Minato et al.

(10) Patent No.: US 10,955,390 B2
(45) Date of Patent: Mar. 23, 2021

(54) AUTOSAMPLER AND LIQUID CHROMATOGRAPH

(71) Applicant: SHIMADZU CORPORATION, Kyoto (JP)

(72) Inventors: Hiroyuki Minato, Kyoto (JP); Takaaki Fujita, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/638,997

(22) PCT Filed: Sep. 1, 2017

(86) PCT No.: PCT/JP2017/031571
§ 371 (c)(1),
(2) Date: Feb. 13, 2020

(87) PCT Pub. No.: WO2019/043907
PCT Pub. Date: Mar. 7, 2019

(65) Prior Publication Data
US 2020/0200717 A1 Jun. 25, 2020

(51) Int. Cl.
*G01N 30/24* (2006.01)
*B01D 15/14* (2006.01)
*B08B 9/035* (2006.01)
*G01N 30/62* (2006.01)
*G01N 30/02* (2006.01)

(52) U.S. Cl.
CPC ............ *G01N 30/24* (2013.01); *B01D 15/14* (2013.01); *B08B 9/035* (2013.01); *G01N 30/62* (2013.01); *G01N 2030/027* (2013.01)

(58) Field of Classification Search
CPC ........ G01N 30/24; G01N 30/62; B01D 15/14; B08B 9/035

USPC .............................................. 73/61.55, 61.56
See application file for complete search history.

(56) References Cited

U.S. PATENT DOCUMENTS

| | | | |
|---|---|---|---|
| 2010/0326215 A1 | 12/2010 | Maeda | |
| 2011/0290042 A1 | 9/2011 | Maeda | |
| 2012/0111127 A1* | 5/2012 | Maeda | ................ G01N 30/24 73/863.01 |
| 2012/0216632 A1 | 8/2012 | Seki | |

(Continued)

FOREIGN PATENT DOCUMENTS

| | | | | |
|---|---|---|---|---|
| JP | H06-148157 A | 5/1994 | | |
| JP | 2007309938 A | * 11/2007 | ............. G01N 35/10 |

(Continued)

OTHER PUBLICATIONS

English translation of Hige (JP2007309938) description obtained from worldwide.espacenet.com, accessed Apr. 27, 2020.*

(Continued)

*Primary Examiner* — Nimeshkumar D Patel
*Assistant Examiner* — Jean F Morello
(74) *Attorney, Agent, or Firm* — Renner, Otto, Boisselle & Sklar, LLP (57) ABSTRACT

An autosampler sucks cleaning liquid from a tip side of a sampling needle and holds the cleaning liquid in the sampling channel before sucking analysis liquid from the tip of the sampling needle, and, after dispensing of the analysis liquid is finished, discharges the cleaning liquid from the tip of the sampling needle, so as to clean the inside of the sampling needle and the sampling channel.

7 Claims, 8 Drawing Sheets

(56) References Cited

U.S. PATENT DOCUMENTS

2015/0308986 A1   10/2015  Ito
2017/0106364 A1*   4/2017  Tomita ............... G01N 35/1095
2019/0025161 A1*   1/2019  Nakamura ......... G01N 35/1097

FOREIGN PATENT DOCUMENTS

| JP | 2011-089955 A | 5/2011 |
| JP | 2011-252718 A | 12/2011 |
| JP | 2014-119400 A | 6/2014 |
| JP | 2016-217867 A | 12/2016 |
| WO | 2009/041441 A1 | 4/2009 |

OTHER PUBLICATIONS

English translation of Maeda (JP2011252718) from worldwide.espacenet.com, accessed Aug. 21, 2020.*
International Search Report for corresponding Application No. PCT/JP2017/031571, dated Nov. 28, 2017.
Written Opinion for corresponding Application No. PCT/JP2017/031571, dated Nov. 28, 2017.
Notice of Reasons for Refusal for corresponding JP Application No. 2019-538876 dated Oct. 26, 2020, with English language translation.

* cited by examiner

AUTOSAMPLER AND LIQUID CHROMATOGRAPH

TECHNICAL FIELD

The present invention relates to an autosampler that automatically injects a sample to be analyzed into an analysis channel of a liquid chromatograph, and a liquid chromatograph including the autosampler.

BACKGROUND ART

A liquid chromatograph autosampler includes a sampling channel connected to a sampling needle whose tip is movable in a horizontal direction and a vertical direction, a metering pump for sucking and discharging liquid, and a rotary type switching valve for switching a channel configuration. In such an autosampler, the metering pump and the sampling needle are in communication with each other by the switching valve, a sample is sucked from the tip of the sampling needle, and the sample is retained in the sampling channel. After that, the switching valve is switched, the sampling channel is inserted between a liquid delivery pump that delivers a mobile phase and an analysis column, and the sample in the sampling channel is introduced into the analysis column by the mobile phase from the liquid delivery pump.

Among such autosamplers, there is one that can execute a pretreatment process in which a sample to be analyzed is mixed with liquid, such as a reagent and a diluent. In the pretreatment process, operation referred to as dispensing, in which a predetermined amount of target liquid is sucked from a vial containing the target liquid with the sampling needle and the sucked liquid is discharged into a vial designated in advance, is generally performed repeatedly for liquid, such as a reagent, a dilution, and a sample.

In the above pretreatment process, contamination may occur if the liquid remains in the sampling needle or the sampling channel after the liquid is discharged into the vial for mixing the liquid. For this reason, it is desirable to clean the inside of the sampling needle and the inside of the sampling channel after the liquid is discharged.

Further, it is necessary to switch the switching valve before the pretreatment process described above so that the pretreatment process can be performed in a manner that the mobile phase does not flow into the sampling channel.

Patent Document 1 discloses an autosampler having a channel configuration, in which a metering pump (syringe pump) can be connected to a cleaning liquid bottle without a sampling needle or a sampling channel interposed between them even in a state where a switching valve is switched so that a mobile phase does not flow into the sampling channel. In such a channel configuration, cleaning liquid can be sucked without the sampling needle or the sampling channel. Accordingly, the cleaning liquid sucked by the metering pump can be allowed to flow from a proximal end side of the sampling channel to a distal end side of the sampling needle, and liquid that causes contamination can be prevented from remaining in the system.

PRIOR ART DOCUMENTS

Patent Documents

Patent Document 1: Japanese Patent Laid-open Publication No. 2016-217867

SUMMARY OF THE INVENTION

Problems to be Solved by the Invention

The manufacturing cost of a rotary type switching valve used in an autosampler is lower as the arrangement and the number of ports and a shape of a groove provided in a rotor are simpler, and, conversely, the manufacturing cost is higher as the arrangement of the ports and the groove shape are complicated and the number of types of groove shapes is larger.

A low-pressure valve of the autosampler disclosed in Patent Document 1 has a plurality of ports provided on the same circumference and one central port provided at the center of those ports. Furthermore, on the rotor of this low-pressure valve, a groove on a straight line for connecting the central port to any of the ports on the circumference is provided in addition to an arc-shaped groove for connecting any two of the ports on the circumference. Such a switching valve has a more complicated structure and requires a higher manufacturing cost than a general multi-port valve having ports only on the same circumference.

In order to allow the metering pump to be connected to the cleaning liquid bottle without a sampling needle or a sampling channel interposed between them even in a state where the switching valve is switched so that a mobile phase does not flow into the sampling channel as in Patent Document 1, there is no way other than to use the switching valve having a complicated structure as described above, which have led to increases in cost of the autosampler.

In view of the above, an object of the present invention is to allow contamination to be suppressed without using a switching valve having a complicated structure.

Solutions to the Problems

An autosampler of the present invention includes a sampling needle, a needle moving mechanism, a sampling channel, a metering pump, a cleaning liquid container, a channel switching part, and a controller. The needle moving mechanism moves the sampling needle. The sampling channel has a tip connected to the sampling needle. The metering pump performs suction and discharge of liquid. Cleaning liquid is stored in the cleaning liquid container. The channel switching part includes an analysis port to which an analysis channel having an analysis column is connected, a mobile phase supply port to which a mobile phase supply channel for supplying a mobile phase to the analysis channel is connected, a sampling port to which a proximal end of the sampling channel is connected, a pump port to which a pump channel leading to the metering pump is connected, and an injection port into which the sampling needle is inserted from the tip to connect the sampling channel. The channel switching part is configured to switch between a loading state and an injection state. The loading state is a state, in which the analysis port and the mobile phase supply port communicate with each other and the sampling port and the pump port communicate with each other. The injection state is a state, in which the mobile phase supply port and the sampling port communicate with each other and the injection port and the analysis port communicate with each other. The controller is configured to control operations of the needle moving mechanism, the metering pump, and the channel switching part.

The controller of the autosampler according to the present invention includes a cleaning liquid sucking execution part and a cleaning liquid discharging execution part. The cleaning liquid sucking execution part is configured to execute, before executing an analysis liquid sucking process for sucking analysis liquid used for analysis from a tip of the sampling needle, a cleaning liquid sucking process for sucking cleaning liquid in the cleaning liquid container from the tip of the sampling needle into the sampling channel using the metering pump in a state where the channel switching part is set to the loading state. The cleaning liquid discharging execution part is configured to execute, after executing an analysis liquid discharging process of discharging analysis liquid sucked in the analysis liquid sucking process from the tip of the sampling needle, a cleaning liquid discharging process for discharging cleaning liquid sucked in the cleaning liquid sucking process from the tip of the sampling needle.

That is, the autosampler of the present invention sucks cleaning liquid from the tip of the sampling needle and holds the cleaning liquid in the sampling channel before sucking analysis liquid from the tip of the sampling needle, and, after dispensing of the analysis liquid is finished, discharges the cleaning liquid from the tip of the sampling needle, so as to clean the inside of the sampling needle and the sampling channel. In this manner, even if a channel configuration that enables connection of the metering pump to the cleaning liquid container without using the sampling needle or the sampling channel is not set when the channel switching part is in the loading state, the inside of the sampling needle and the sampling channel can be cleaned, and contamination can be suppressed. Therefore, in the autosampler of the present invention, a switching valve having a complicated structure does not need to be used as the channel switching part, and increases in cost can be suppressed.

The channel switching part preferably includes a cleaning liquid port to which a channel leading to the cleaning liquid container is connected, and is preferably configured so that the injection port and the cleaning liquid port may communicate with each other in the loading state. In this case, the cleaning liquid sucking execution part is configured, in the cleaning liquid sucking process, to cause the metering pump and the cleaning liquid storage part to communicate with each other via the sampling channel by setting the channel switching part to the loading state and inserting the tip of the sampling needle into the injection port, and to suck cleaning liquid in the cleaning liquid container into the sampling channel from the tip side of the sampling needle with the metering pump.

Specifically, the channel switching part may include a first switching valve and a second switching valve, each of which has one port connected to each other via a channel. In that case, the first switching valve has the analysis port, the mobile phase supply port, the sampling port, the pump port, the injection port, and a port leading to the second switching valve, and the second switching valve has the cleaning liquid port and a port leading to the first switching valve. Then, the second switching valve is configured so that the cleaning liquid port and the port leading to the first switching valve may communicate with each other in the loading state.

The cleaning liquid sucking execution part is preferably configured to suck cleaning liquid whose amount is at least three times that of a suction amount of analysis liquid in the analysis liquid sucking process executed immediately after the cleaning liquid sucking process in the cleaning liquid sucking process. In such a manner, a high cleaning effect can be obtained for the inside of the sampling needle and the sampling channel, and contamination can be suppressed highly efficiently.

The controller preferably further includes an air sucking execution part that is configured to execute an air sucking process for sucking a predetermined amount of air from the tip of the sampling needle after executing the cleaning liquid sucking process and before executing the analysis liquid sucking process. As a predetermined amount of air is sucked from the tip of the sampling needle before the analysis liquid sucking process is executed, an air layer is formed between the cleaning liquid sucked first and the analysis liquid sucked later in the sampling channel. Accordingly, the analysis liquid is prevented from being diluted with the cleaning liquid, and the cleaning liquid is prevented from being contaminated with the analysis liquid.

A liquid chromatograph according to the present invention includes an analysis channel through which a mobile phase flows, an autosampler according to any of the above embodiments configured to inject a sample in the analysis channel, an analysis column that is provided downstream of the autosampler on the analysis channel, and for separating a sample injected in the analysis channel by the autosampler into individual components, and a detector provided downstream of the analysis column on the analysis channel, and for detecting the components separated by the analysis column.

Effects of the Invention

In the autosampler according to the present invention, cleaning liquid retained in the sampling channel before analysis liquid is sucked from the tip of the sampling needle is discharged from the tip of the sampling needle after the dispensing of the analysis liquid is finished, so that the inside of the sampling channel and the sampling channel is cleaned. Accordingly, the inside of the sampling channel and the sampling channel can be cleaned without leaving liquid that causes contamination in the system without using a switching valve having a complicated structure. If a switching valve having a complicated structure is not used, the apparatus can be constructed at low cost.

The liquid chromatograph according to the present invention uses the autosampler. Accordingly, contamination can be suppressed at low cost.

EMBODIMENT OF THE INVENTION

Hereinafter, an embodiment of the autosampler and the liquid chromatograph according to the present invention will be described using the drawings.

Figure 1:
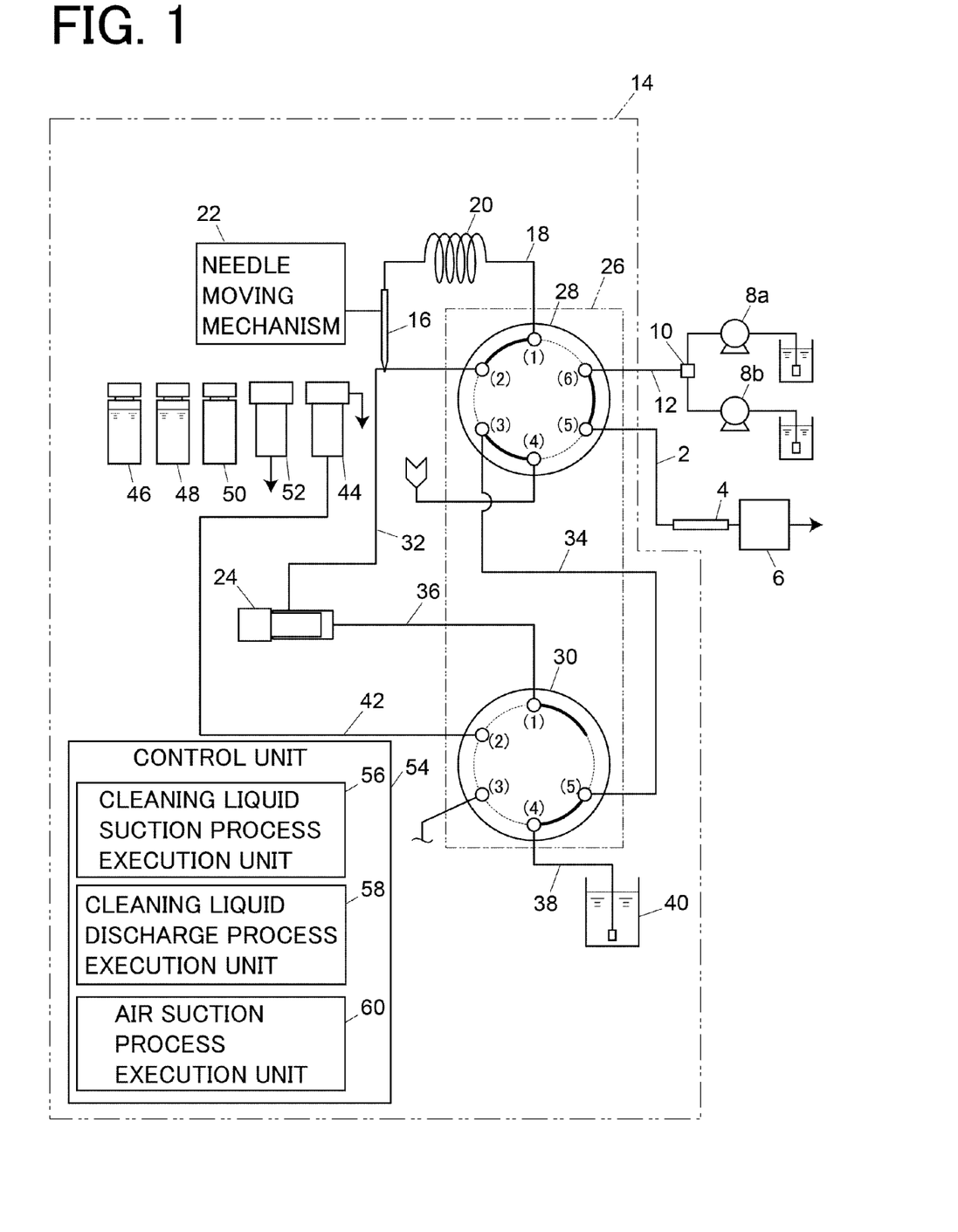
FIG. 1 is a schematic configuration diagram showing an embodiment of a liquid chromatograph.

First, a configuration of an embodiment of the liquid chromatograph including the autosampler will be described with reference to FIG. 1.

The liquid chromatograph of the present embodiment includes an analysis channel 2, a mobile phase supply channel 12 for supplying a mobile phase to the analysis channel 2, and an autosampler 14 configured to automatically inject a sample into the analysis channel 2. On the analysis channel 2, an analysis column 4 and a detector 6 are provided in this order from an upstream side. The mobile phase supply channel 12 is a channel for delivering a solvent from liquid delivery pumps 8a and 8b mixed in a mixer 10 as the mobile phase.

The autosampler 14 includes a sampling needle 16, a sampling channel 18, a needle moving mechanism 22, a metering pump 24, a channel switching part 26, a cleaning liquid container 40, and a controller 54.

In the present embodiment, the channel switching part 26 for switching a channel configuration is constituted by two rotary type switching valves 28 and 30.

The switching valve 28 has six ports (1) to (6). The ports (1) to (6) of the switching valve 28 are equally disposed counterclockwise on the same circumference. The switching valve 28 can be switched to any one of a state, in which the ports (1) and (2), the ports (3) and (4), and the ports (5) and (6) communicate with each other, and a state in which the ports (1) and (6), the ports (2) and (3), and the ports (4) and (5) communicate with each other.

Hereinafter, the state in which the ports (5) and (6) of the switching valve 28 communicate with each other, that is, the state in which the analysis channel 2 and the mobile phase supply channel 12 are connected in the shortest time (FIGS. 1, 3, 4, 5, 6, and 7) will be referred to as a "loading state". On the other hand, in the switching valve 28, the state in which the ports (1) and (6), the ports (2) and (3), and the ports (4) and (5) communicate with each other (the state shown in FIG. 2) will be referred to as an "injection state".

The sampling needle 16 has a suction and discharge port for sucking or discharging liquid at the tip. The sampling needle 16 is moved in the horizontal direction and the vertical direction by the needle moving mechanism in a state where the tip faces vertically downward.

The sampling channel 18 has the tip connected to an upper end of the sampling needle 16 and a proximal end connected to the port (1) of the switching valve 28. That is, the port (1) of the switching valve 28 constitutes a sampling port. A sample loop 20 for retaining liquid sucked from the tip of the sampling needle 16 is provided on the sampling channel 18.

The metering pump 24 has two suction and discharge ports for sucking and discharging liquid. One of the suction and discharge ports of the metering pump 24 is connected to the port (2) of the switching valve 28, and the other one of the suction and discharge port is connected to the port (1) of the switching valve 30. That is, the port (2) of the switching valve 28 constitutes a pump port.

The port (4) of the switching valve 28 is an injection port for connecting the sampling channel 18 by inserting the tip of the sampling needle 16. The analysis channel 2 is connected to the port (5) of the switching valve 28, and the mobile phase supply channel 12 is connected to the port (6) of the switching valve 28. That is, the port (5) of the switching valve 28 serves as an analysis port, and the port (6) of the switching valve 28 serves as a mobile phase supply port.

The switching valve 30 has five ports (1) to (5). The ports (1) to (5) of the switching valve 30 are disposed counterclockwise on the same circumference. The switching valve 30 can be switched to a state in which the ports (4) and (5) are connected, a state in which the ports (1) and (2) are connected, and a state in which the center of the groove of the rotor is aligned with the ports (1) and (5) and not connected to any port.

The port (3) of the switching valve 28 and the port (5) of the switching valve 30 are connected to each other via a channel 34. The port (4) of the switching valve 30 is connected to a channel 38 that leads to a cleaning liquid bottle 40 as a cleaning liquid container. That is, the port (4) of the switching valve 30 constitutes a cleaning liquid port. As the cleaning liquid, methanol, acetonitrile, or the like can be used.

The autosampler 14 further includes a needle cleaning part 44 that stores a cleaning liquid in the inside, and cleans an outer peripheral surface and an inner peripheral surface of the sampling needle 16 as the sampling needle 16 is inserted from above, and a drain port 52 for draining liquid discharged from the tip of the sampling needle 16. Further, in the inside of the autosampler 14, analysis liquid vials 46 and 48 in which an analysis liquid, such as a sample, a reagent, a diluent, and the like are stored, and a mixing vial 50 for mixing the analysis liquid are provided. Note that, in the diagram, two of the analysis liquid vials 46 and 48 and one of the mixing vial 50 are shown. However, the numbers of the analysis liquid vials and the mixing vials are not limited.

The controller 54 is configured to control operation of the needle drive mechanism 22, the metering pump 24, and the channel switching part 26. The controller 54 includes a cleaning liquid sucking execution part 56, a cleaning liquid discharging execution part 58, and an air sucking execution part 60. The controller 54, the cleaning liquid sucking execution part 56, the cleaning liquid discharging execution part 58, and the air sucking execution part 60 may be functions obtained by an arithmetic element, such as a microcomputer, executing a predetermined program, or may be realized by a dedicated computer or a personal computer.

As processes of general operation by the autosampler 14, there are an analysis liquid sucking process for sucking desired analysis liquid from the tip of the sampling needle 16 and retaining the analysis liquid in the sample loop 20, and an analysis liquid discharging process for discharging analysis liquid retained in the sample loop 20 into the mixing vial 50.

The cleaning liquid sucking execution part 56 is configured to execute a cleaning liquid sucking process for sucking cleaning liquid in the cleaning liquid container 40 from the tip side of the sampling needle 16 and retaining the cleaning liquid in the sample loop 20 before executing the analysis liquid sucking process described above.

The cleaning liquid discharging execution part 58 is configured to execute a cleaning liquid discharging process in which the cleaning liquid retained in the sample loop 20 is discharged from the tip of the sampling needle 16 after executing the analysis liquid discharging process described above.

The air sucking execution part 60 is configured to execute the air sucking process of sucking a predetermined amount of air from the tip of the sampling needle 16 after executing the cleaning liquid sucking process described above and before executing the analysis liquid sucking process.

Figure 6:
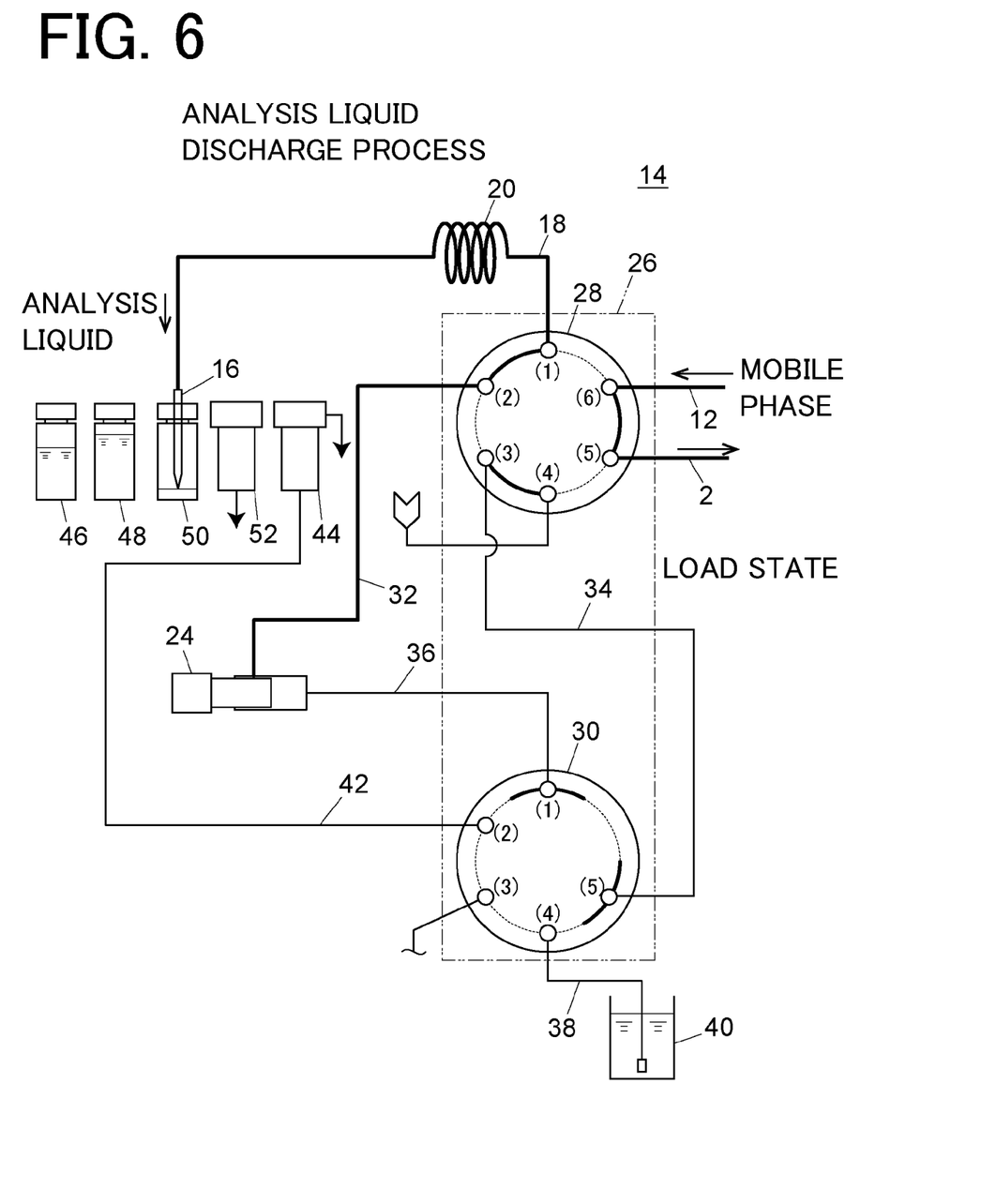
FIG. 6 is a diagram showing a channel configuration of the autosampler of the embodiment in an analysis liquid discharging process.
Figure 7:
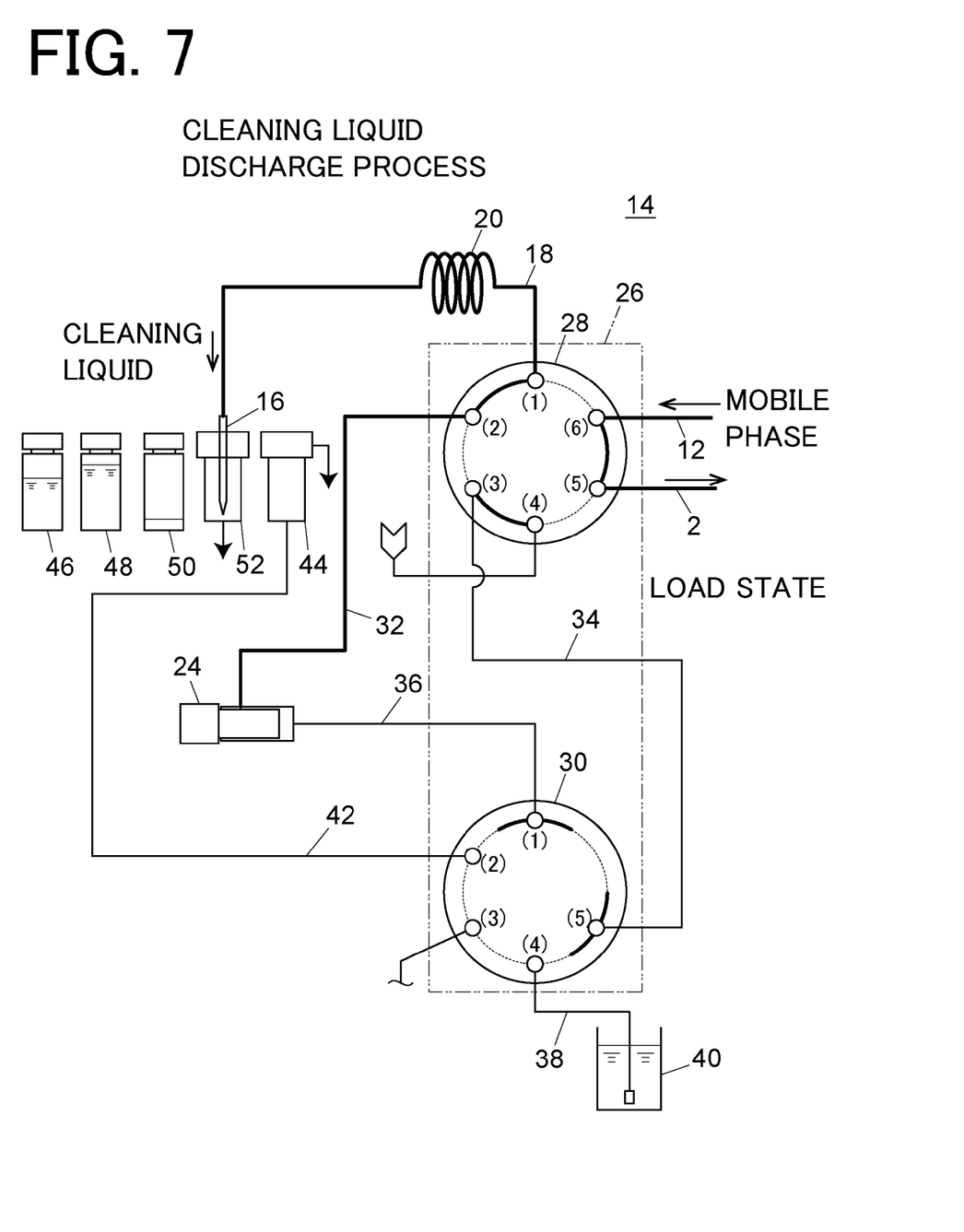
FIG. 7 is a diagram showing a channel configuration of the autosampler of the embodiment in a cleaning liquid discharging process.
Figure 8:
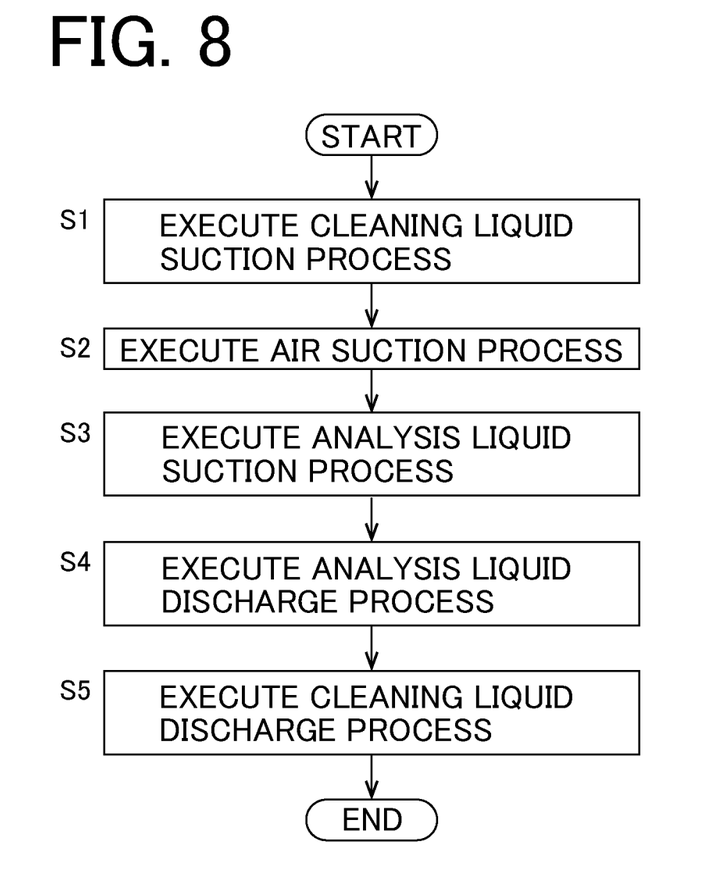
FIG. 8 is a flowchart for explaining a series of operations for dispensing analysis liquid by the autosampler of the embodiment.

A series of operations for dispensing the analysis liquid realized by the controller 54 including the cleaning liquid sucking execution part 56, the cleaning liquid discharging execution part 58, and the air sucking execution part 60 will be described using channel configuration diagrams of the states of FIGS. 2 to 7 and a flowchart of FIG. 8.

Figure 2:
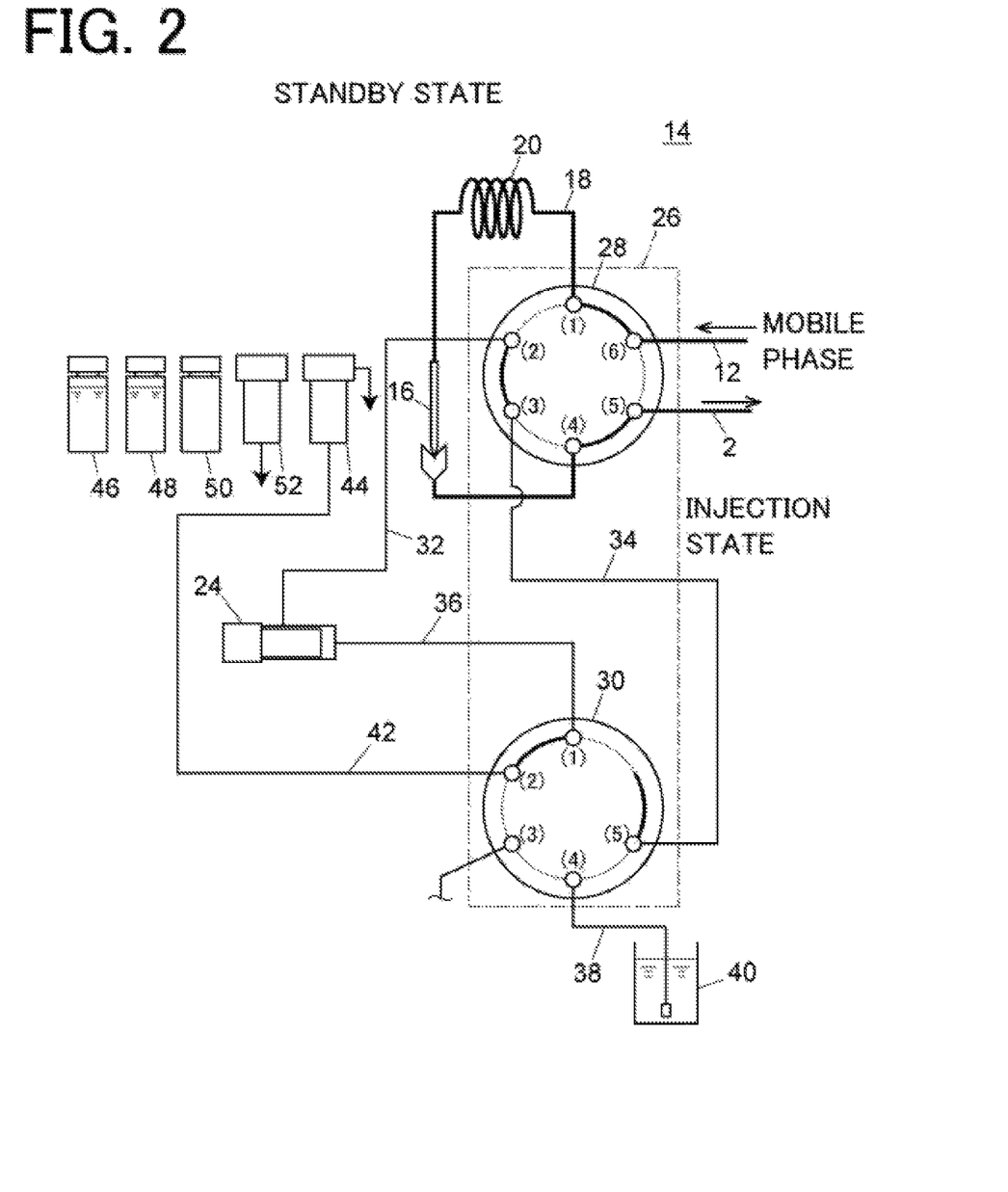
FIG. 2 is a diagram showing a channel configuration of an autosampler of the embodiment in a standby state.

FIG. 2 shows a standby state before the dispensing operation is started. In this standby state, the tip of the sampling needle 16 is inserted into the injection port (4) of the switching valve 28, and the switching valve 28 is in an injecting state. In this manner, the mobile phase supply channel 12 and the analysis channel 2 communicate with each other via the sampling channel 18, the sampling needle 16, and the injection port (4) of the switching valve 28.

Figure 3:
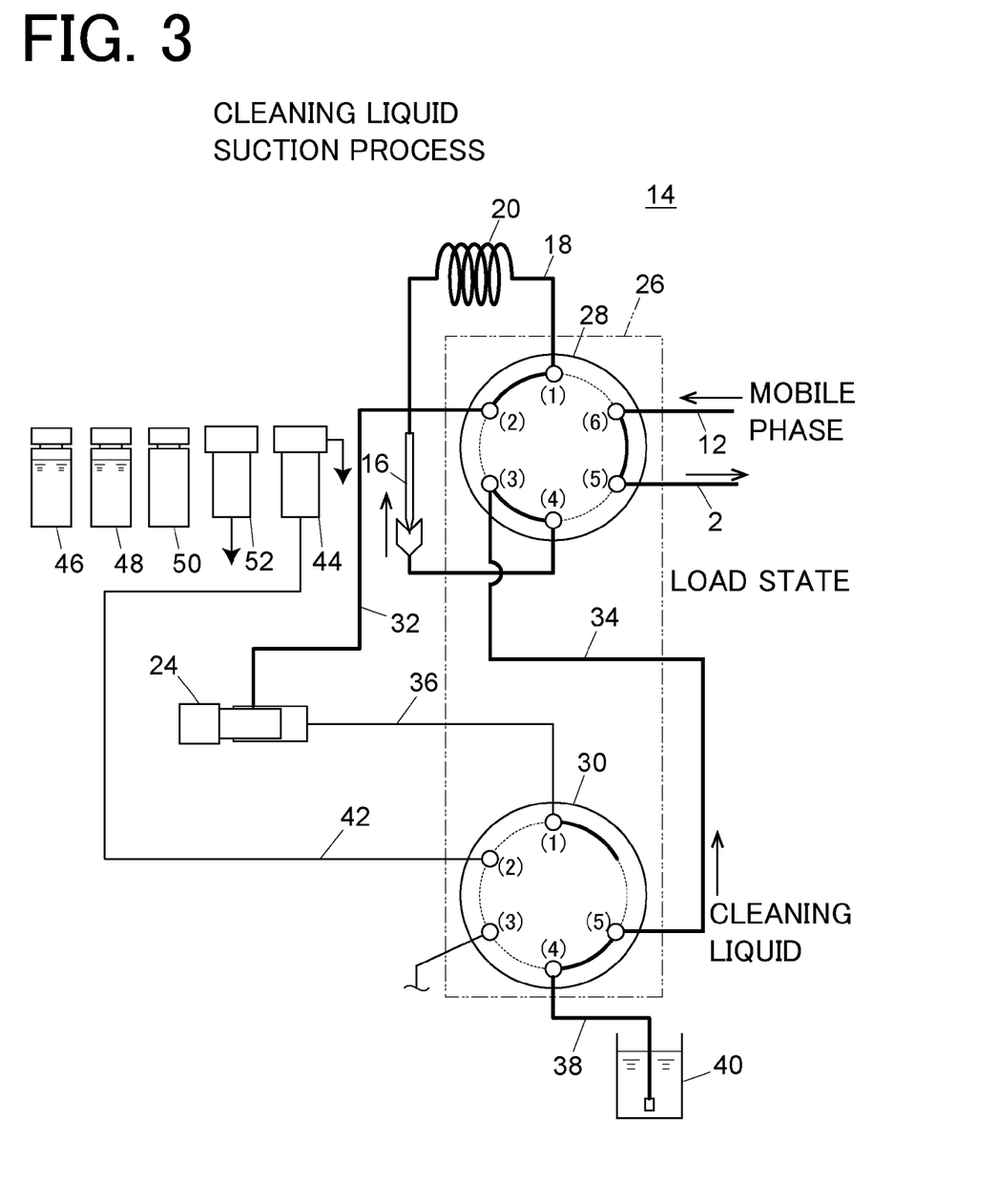
FIG. 3 is a diagram showing a channel configuration of the autosampler of the embodiment in a cleaning liquid sucking process.

When the dispensing operation for the analysis liquid is started, the cleaning liquid sucking process is executed by the function of the cleaning liquid sucking execution part 56 (Step S1). In the cleaning liquid sucking process, as shown in FIG. 3, the switching valve 28 is switched to the loading state, and the switching valve 30 is switched to the state where the ports (4) and (5) communicate with each other. In this manner, the metering pump 24 and the cleaning liquid bottle 40 are connected via the sampling channel 18 and the sampling needle 16. In this state, the metering pump 24 is driven in the suction direction, and a predetermined amount of the cleaning liquid is sucked from the tip side of the sampling needle 16, and the cleaning liquid is retained in the sample loop 20. An amount of the cleaning liquid retained in the sample loop 20 is preferably determined according to an amount of the analysis liquid sucked in the analysis liquid sucking process executed immediately after the cleaning liquid sucking process.

Figure 4:
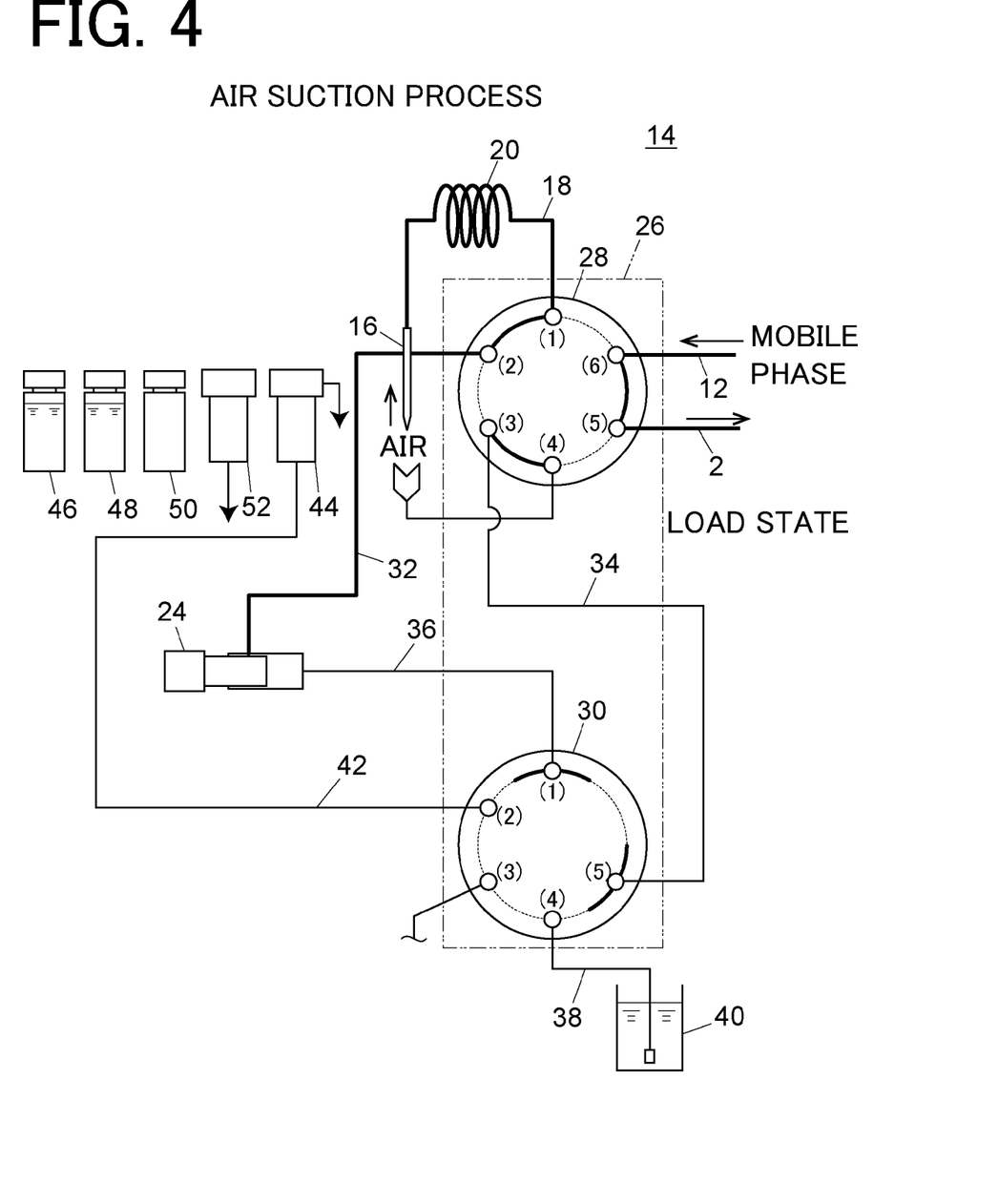
FIG. 4 is a diagram showing a channel configuration of the autosampler of the embodiment in an air intake process.

After the cleaning liquid sucking process is completed, an air sucking process is executed by the air sucking execution part 60 (Step S2). In the air sucking process, as shown in FIG. 4, the switching valve 28 is left in the loading state, the switching valve 30 is not connected to any port, the sampling needle 16 is pulled out from the injection port (4) of the switching valve 28, the metering pump 24 is further driven to the suction side, and a predetermined amount of air is sucked from the tip of the sampling needle 16.

Figure 5:
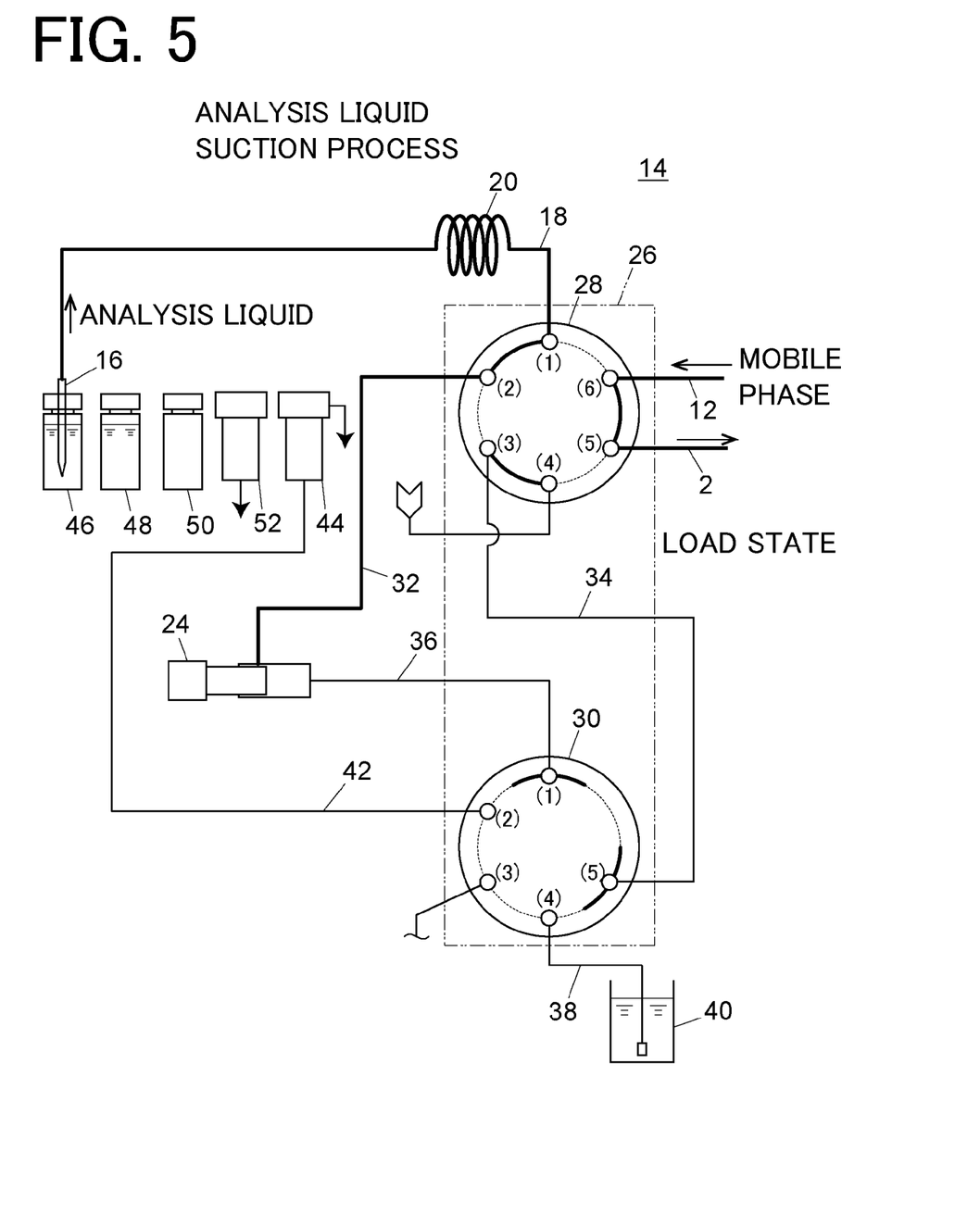
FIG. 5 is a diagram showing a channel configuration of the autosampler of the embodiment in an analysis liquid sucking process.

After the air sucking process described above is completed, the controller 54 executes the analysis liquid sucking process (Step S3). In the analysis liquid sucking process, as shown in FIG. 5, the switching valve 28 is left in the loading state, the switching valve 30 is not connected to any port, the sampling needle 16 is moved to the position of a desired analysis liquid vial 46 (or 48), the tip of the sampling needle 16 is immersed in the analysis liquid in the analysis liquid vial 46 (or 48), the metering pump 24 is further driven to the suction side, and a predetermined amount of the analysis liquid is sucked from the tip of the sampling needle 16. Since the air sucking process is executed before this analysis liquid sucking process, an air layer is interposed between the cleaning liquid and the analysis liquid in the sampling channel 18, and the analysis liquid is prevented from being diluted with the cleaning liquid and the cleaning liquid is prevented from being contaminated by the analysis liquid.

The controller 54 executes the analysis liquid discharging process after the analysis liquid sucking process described above is completed (Step S4). In the analysis liquid discharging process, as shown in FIG. 6, the switching valve 28 is left in the loading state, the switching valve 30 is not connected to any port, the sampling needle 16 is moved to the position of a predetermined dispensing destination (the mixing vial 50 in the diagram), the metering pump 24 is driven to a discharge direction, and a predetermined amount of the analysis liquid is discharged from the tip of the sampling needle 16.

After the analysis liquid discharging process described above is completed, the cleaning liquid discharging process is executed by the cleaning liquid discharging execution part 58 (Step S5). In the analysis liquid discharging process, as shown in FIG. 7, the switching valve 28 is left in the loading state, the switching valve 30 is not connected to any port, the sampling needle 16 is moved to the position of the drain port 52, the metering pump 24 is driven in the discharge direction, and the cleaning liquid is discharged from the tip of the sampling needle 16. In this manner, the analysis liquid remaining in the sampling needle 16 and the sampling channel 18 is discharged together with the cleaning liquid to the drain port 52, and contamination is suppressed.

The inventors of the present invention have verified the effect of suppressing contamination by executing the cleaning liquid sucking process and the cleaning liquid discharging process described above. In this verification, water containing caffeine at a concentration of 200 ppm was used as a sample, pure water was used as a diluent, and a mixed solution methanol and pure water are mixed at a volume ratio of 70:30 was used as cleaning liquid. As a pretreatment step, 90 µL of caffeine water of the sample and 90 µL of pure water of the diluted solution are dispensed into a mixing vial to prepare 180 µL of a two-fold diluted sample solution, and analysis was performed without taking the sample solution into the apparatus, and only a contamination portion remaining in the channel was detected. Further, the capacity of the sample loop 20 of the apparatus at this time was 100 µL.

In order to compare an effect of verification operation described later, as conventional operation, dispensing operation in which 90 µL of a diluent is sucked from the tip of the sampling needle 16 and discharged into the mixing vial 50 was performed, and then dispensing operation in which, after the sample needle 16 is immersed into the cleaning liquid of the cleaning port, and then 90 µL of the sample was sucked from the tip of the sampling needle 16 and discharged into the mixing vial 50 was performed. Next, in order to mix the sample, operation referred to as mixing operation that performs suction and discharge in the mixing vial was performed three times, and then analysis was performed by switching the switching valve 28 to the injection side to obtain a peak area of an analysis result. In this manner, a contamination rate derived from the sample remaining in the sampling needle 16 and the sampling channel 20 was obtained. Note that the contamination rate can be obtained by a contamination peak area/a known concentration peak area.

In the verification operation, 73 µL of the cleaning liquid is sucked from the tip side of the sampling needle 16 as the operation of the first half. Next, 6 µL of air is sucked from the tip of the sampling needle 16. Next, dispensing operation in which 20 µL of the diluent is sucked from the tip of the sampling needle 16 and discharged into the mixing vial 50 is performed. Next, 73 µL of the cleaning liquid and 6 µL of air are discharged in the drain port 52. Next, the sample needle 16 is immersed in the cleaning liquid in the cleaning port. The series of operations in the first half are repeated five times. However, a diluent suction amount for the fifth repeated operation is 10 µL, and the total diluent dispensing amount is 90 µL. As the operation of the second half, 73 µL of the cleaning liquid is sucked from the tip side of the sampling needle 16. Next, 6 µL of air is sucked from the tip of the sampling needle 16. Next, dispensing operation in which 20 µL of the sample is sucked from the tip of the sampling needle 16 and discharged into the mixing vial 50 is performed. Next, 73 μL of the cleaning liquid and 6 μL of air are discharged in the drain port 52. Next, the sample needle 16 is immersed in the cleaning liquid in the cleaning port. The series of operations in the second half are repeated five times. However, a sample suction amount for the fifth repeated operation is 10 μL, and the total sample dispensing amount is 90 μL. Next, the mixing operation was performed three times in the mixing vial, and then analysis was performed by switching the switching valve 28 to the injection side to obtain a peak area of an analysis result. In this manner, a contamination rate derived from the sample remaining in the sampling needle 16 and the sampling channel 20 was obtained.

As a result of the above verification, the contamination rate in the conventional operation was 15.22%, whereas the contamination rate in the verification operation was 0.31%. This shows that the contamination rate can be greatly improved by sucking the cleaning liquid before dispensing the analysis liquid and discharging the cleaning liquid after dispensing the analysis liquid.

Further, from this verification, it was found that the contamination rate is improved to about 1/50 by sucking and discharging the cleaning liquid whose amount is about 3.5 times the dispensing amount of the analysis solution. From the above, in the cleaning liquid sucking process, it was found that a sufficient contamination suppression effect can be obtained by sucking the cleaning liquid whose amount is at least three times or more the suction amount of the analysis liquid in the analysis liquid sucking process performed subsequently.

Note that, although not described in the above embodiment, the configuration may be such that, in the cleaning liquid sucking process, the sampling needle 16 is moved to the needle cleaning part 44, and the cleaning liquid stored in the needle cleaning part 44 is sucked from the tip of the sampling needle 16. However, since this method is based on the premise that the cleaning liquid stored in the needle cleaning part 44 is not contaminated, there are problems, such as an increase in the amount of replacement of the cleaning liquid after analysis.

DESCRIPTION OF REFERENCE SIGNS

2: Analysis channel
4: Analysis column
6: Detector
8a, 8b: Liquid delivery pump
10: Mixer
12: Mobile phase supply channel
14: Autosampler
16: Sampling needle
18: Sampling channel
20: Sample loop
22: Needle moving mechanism
24: Metering pump
26: Channel switching part
28, 30: Switching valve
32, 34, 36, 38, 42: Channel
40: Cleaning liquid bottle (cleaning liquid container)
44: Needle cleaning part
46, 48: Analysis liquid vial
50: Mixing vial
52: Drain port
54: Controller
56: Cleaning liquid sucking execution part
58: Cleaning liquid discharging execution part
60: Air sucking execution part

The invention claimed is:

1. An autosampler comprising:
   a sampling needle;
   a needle moving mechanism for moving the sampling needle;
   a sampling channel having a tip connected to the sampling needle;
   a metering pump for sucking and discharging liquid;
   a cleaning liquid container for storing cleaning liquid;
   a channel switching part including an analysis port to which an analysis channel having an analysis column is connected, a mobile phase supply port to which a mobile phase supply channel for supplying a mobile phase to the analysis channel is connected, a sampling port to which a proximal end of the sampling channel is connected, a pump port to which a pump channel leading to the metering pump is connected, and an injection port into which the sampling needle is inserted from the tip to connect the sampling channel, and being configured to be able to switch between a loading state and an injection state, the loading state being a state, in which the analysis port and the mobile phase supply port communicate with each other and the sampling port and the pump port communicate with each other, the injection state being a state, in which the mobile phase supply port and the sampling port communicate with each other and the injection port and the analysis port communicate with each other; and
   a controller for controlling operation of the needle moving mechanism, the metering pump, and the channel switching part, wherein
   the controller includes:
      a cleaning liquid sucking execution part configured to execute, before executing an analysis liquid sucking process for sucking analysis liquid used for analysis from a tip of the sampling needle, a cleaning liquid sucking process for sucking cleaning liquid in the cleaning liquid container from the tip of the sampling needle into the sampling channel using the metering pump in a state where the channel switching part is set to the loading state; and
      a cleaning liquid discharging execution part configured to execute, after executing an analysis liquid discharging process of discharging analysis liquid sucked in the analysis liquid sucking process from the tip of the sampling needle, a cleaning liquid discharging process for cleaning inside of the sampling needle by discharging cleaning liquid sucked in the cleaning liquid sucking process from the tip of the sampling needle.

2. The autosampler according to claim 1, wherein
the channel switching part includes a cleaning liquid port to which a channel leading to the cleaning liquid container is connected, and is configured so that the injection port and the cleaning liquid port may communicate with each other in the loading state, and
the cleaning liquid sucking execution part is configured, in the cleaning liquid sucking process, to cause the metering pump and the cleaning liquid container to communicate with each other via the sampling channel by setting the channel switching part to the loading state and inserting the tip of the sampling needle into the injection port cleaning cleaning liquid container, and to suck cleaning liquid in the cleaning liquid container into the sampling channel from a tip side of the sampling needle with the metering pump.

3. The autosampler according to claim 2, wherein
the channel switching part includes a first switching valve and a second switching valve, each of which has one port connected to each other via a channel,
the first switching valve has the analysis port, the mobile phase supply port, the sampling port, the pump port, the injection port, and a port leading to the second switching valve, and
the second switching valve has the cleaning liquid port and a port leading to the first switching valve, and is configured so that the cleaning liquid port and the port leading to the first switching valve may communicate with each other in the loading state.

4. The autosampler according to claim 1, wherein the cleaning liquid sucking execution part is configured to suck cleaning liquid whose amount is at least three times a suction amount of analysis liquid in the analysis liquid sucking process executed immediately after the cleaning liquid sucking process in the cleaning liquid sucking process.

5. The autosampler according to claim 1, wherein the controller further includes an air sucking execution part that is configured to execute an air sucking process for sucking a predetermined amount of air from the tip of the sampling needle after executing the cleaning liquid sucking process and before executing the analysis liquid sucking process.

6. A liquid chromatograph comprising:
an analysis channel through which a mobile phase flows;
an autosampler according to claim 1 that configured to inject a sample in the analysis channel;
an analysis column provided downstream of the autosampler on the analysis channel, and for separating a sample injected in the analysis channel by the autosampler into individual components; and
a detector provided downstream of the analysis column on the analysis channel, and for detecting the components separated by the analysis column.

7. The autosampler according to claim 1, wherein the cleaning liquid discharging execution part configured to execute the cleaning liquid discharging process in a state where the sampling needle is connected to the injection port.

* * * * *